Patented Nov. 15, 1938

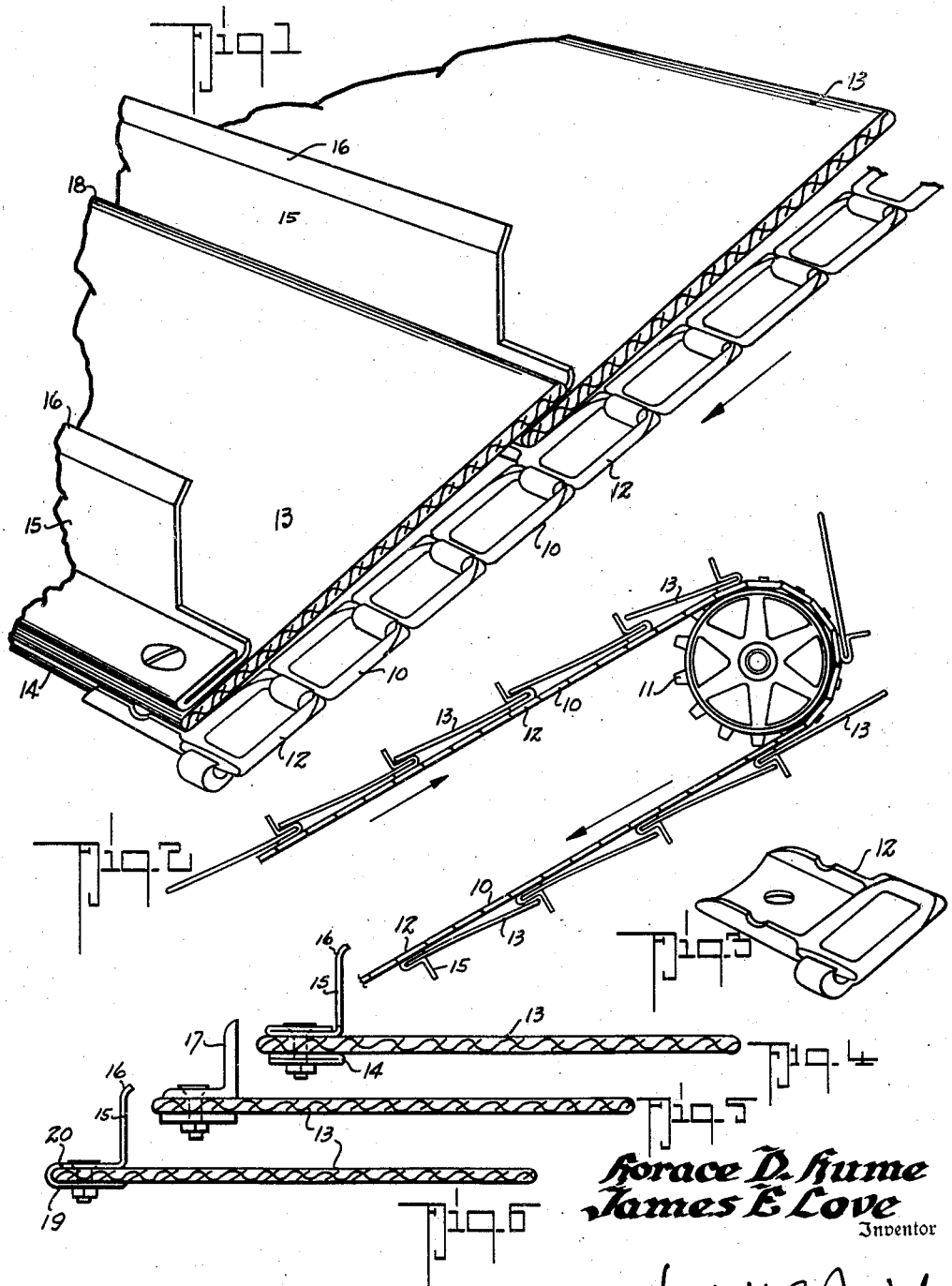

2,136,363

UNITED STATES PATENT OFFICE 2,136,363

CONVEYER BELT

Horace D. Hume and James E. Love, Garfield, Wash., assignors to Hume-Love Company, Garfield, Wash., a corporation Application May 22, 1937, Serial No. 144,164

5 Claims. (Cl. 198—195)

Our present invention relates to improvements in conveyer belts of a type designed for use as an improved means for use in agriculture, for conveying cut grains, greases, and especially of leguminous crops that are more or less tangled or matted and have to be moved from a point close to the ground to an elevated position for delivery into a rack, wagon, or truck for conveyance to a place where it will be stacked or otherwise handled and treated.

Hithertofore conveyer belts for handling such crops have been of the so-called "draper belt" type consisting of spaced belts to which is secured a canvas strip from three or four feet in width and of continuous length with cross slats usually of wood on the upper face of the belt. These belts at the ends are supported and move over rollers and the crops, especially of the leguminous type which are especially hard to handle, frequently wrap around the roller and get between the belt and the roller to the rapid disintegration of the draper belt. Belts of this type have been known to last only for a few hours of use and being initially expensive set up a condition that our improved belt is intended to remedy.

The belt of our invention is adapted not only for use in harvesting of various grains or other forms of crops but is especially useful in handling wheat or grain crops of the hay type. It is also especially valuable in connection with vine crops and is as well adaptable to the conveyance of granular materials of all kinds that not only have to be conveyed but usually are moved on an incline to some elevated position.

A further benefit and object is the provision of a belt in sectionalized form that permits of ready repairs or the insertion of sections and which in use in conveying matter provides a kick or throwing of the material or matter over the end of the belt onto other belts or other points of delivery so as to clear the mechanism, shafting, or the like that otherwise would tend to contact with the crop or matter and cause interference in the ready operation of the conveyer belt.

The invention consists in certain novel combinations and arrangements of parts as will hereinafter be more fully set forth and claimed. In the accompanying drawing we have illustrated one complete example of the physical embodiment of our invention, wherein the parts are combined and arranged according to one mode we have devised for the practical application of the principles of our invention.

Figure 1 is a fragmentary perspective view of a portion of our belt showing the sectionalized belt features and one of the conveyor sprocket chains in association with the belt proper.

Figure 2 is an end view of the belt showing it in position over a sprocket wheel and which view indicates the elevated or delivery end of the belt.

Figure 3 is a perspective view of one of the special links used in connection with the sprocket chain and which assists in supporting the belt in its flight arrangement.

Figures 4, 5, and 6 are cross sectional views through the sectionalized belt showing various forms of cleats and cross bars through which the belt is connected to the special link forming one of the links of the conveyer chain.

In order that the general arrangement and utility of the conveyer belt may be readily understood we have shown in Figure 2 a portion of the belt in its working position and this belt is shown mounted on the usual conveyer sprockets to illustrate the change in position of the belt sections as the belt moves around the sprockets on the delivery end of the conveyer. By this illustration it will be readily seen that such matter or material as is carried on the belt will be propelled or forced away from the belt at the time of delivery so that it can not clog or wrap around the upper conveyer shaft to cause stoppage and thus loss of time in operation.

In carrying out our invention we employ two spaced parallel sprocket chains 10 mounted at the ends of the conveyer on suitable sprockets 11 for the chains, which sprockets are keyed or otherwise secured to cross shafts that in turn are mounted through suitable bearings upon a proper framework or structure for support. The sprocket chains at intervals are fitted with special links 12 such as the link disclosed in Figure 3. These links are readily accessible and are on the market and available in rights and lefts. To these special links the conveyer sections of our invention are secured by bolts, rivets, or other secure fastening means. The belt sections comprise a length of rubber or rubberized belt 13 of the type usually used for belt drives, which has considerable flexibility and at the same time has sufficient supporting power for such use as our belt may be put to.

To this belt section we secure a cross bar 14 on the under side of the belt section and a cleat 15 preferably of metal is formed in the manner shown in Figures 4, 5, or 6 and is secured on the upper edge directly over the cross bar and attached to the cross bar by rivets, bolts, or other fastening means. The belt section thus formed comprising the flexible belt 13, the cross bar 14, and the cleat 15 form a unit which is attached to the special link members 12 by a proper bolt or rivet. In this manner the bar 14 as well as the belt and the cleat serve as spacing means for the sprocket chains 10 and allow ready operation of the belt sections in their operative travel. The cleat 15 may be formed from sheet metal by bending the strip on itself as indicated in Figure 1 and then providing an upturned edge and for our special purpose and agricultural use we prefer to bend rearward the extreme upper edge 16 as shown.

While this is a preferred form it may be readily seen that such a shape as disclosed in Figure 5 will be suitable in which a light weight angle iron 17 is used on the upper edge of the belt together with a cross bar on the lower edge and the belt 13 locked or clamped therebetween.

For a simplified form of construction the form of cleat may be made as shown in Figure 6, in which the cross bar and the cleat are formed of one strip of metal bent as indicated in that figure and the belt is secured by riveting or otherwise fastening between the lower formed portion 19 of the cleat and the upper or base portion 20 of the cleat.

Various forms of cross bars and of the cleats may be used to meet various materials that are to be conveyed. We do not wish to be limited in the use or selection of any particular type of cleat or of any particular type of cross bar.

With the belt thus formed we have secured extreme flexibility in a belt that will readily travel over the sprockets in conjunction with the parallel chains operating on those sprockets and the belt sections operating between the sprocket chains and being secured to the special links only will insure the conveyance of loose or granular material and is also adapted for the conveying of vine crops or the like with equal facility.

The belt sections at their rear edge 18 are supported in alignment and rest upon the base of the adjacent cleat so as to provide a smooth and uniform deck surface for the materials and, further, to insure against granular materials dropping through the conveyer.

When the sections reach the end of the conveyer at the sprockets the flexibility of the belt sections insures that such material as may be on the belt will be projected forward and away from the sprockets or their shaft and therefore provide for continuous operation without the possibility of vine or grain crops wrapping around and building up on the delivery end shaft.

A particular use to which our conveyer is adapted is for the handling of the pea crop which is a vine crop and extremely difficult to handle with the present type of draper belts. In our special use we use such a conveyer for elevating on an incline such crops as may be deposited upon the conveyer from the cutting or pick-up devices. The crop thereupon is elevated to the proper angle where it may be deposited into a wagon bed, rack, or other equipment. In this way we are enabled to handle with facility a great bulk of material in an extremely short period of time and to insure against loss of shelled peas or other matter that may drop from the crop during the conveying period.

Having thus fully described our invention, what we claim as new and desire to secure by Letters Patent is:—

1. In a conveyer belt, the combination with spaced link belts, of sectional conveyer elements secured between the belts, said conveyer elements comprising a flexible belt section, a cross bar, and a cleat having a raised edge, said bar and cleat secured to said belt along one edge thereof and on opposite sides of the belt section, means for securing the cross bar and cleat to special links in said link belt so that the trailing edge of one belt section overlaps the succeeding conveyer element and rests upon the cleat of said succeeding element.

2. In a conveyer belt, the combination with spaced link belts, of special connecting links at spaced intervals on said link belts, a cross bar secured to the special sections of said link belt, a conveyer element secured along its forward edge to said cross bar on the upper side thereof, a cleat on the upper side of the conveyer element directly over the said cross bar, the opposite edge of said conveyer element resting upon the cleat of the succeeding conveyer element.

3. In a conveyer belt, the combination with spaced belts, of sectional conveyer elements secured between said spaced belts, said conveyer elements comprising a belt section, a cross bar and a cleat secured along the forward edge thereof, said conveyer elements being spaced so that the opposite edge of each conveyer element will rest upon the succeeding conveyer element in overlapped relation therewith.

4. In a continuous-deck conveyer-belt comprising a pair of spaced link belts, the combination with a pair of cross-bars connected to the link belts, of a pair of conveyer-elements each mounted at its leading edge on a cross bar, a cleat mounted on the leading edge of each conveyer-element, and said conveyer-elements being spaced so that the rear edge of the leading element rests upon the leading edge of the following element.

5. In a continuous-deck conveyer-belt comprising a pair of spaced link belts, the combination with a pair of cross-bars connected to the link belts, of a pair of over-lapped conveyer-elements mounted at their leading edges on said cross-bars, and a cleat angular in cross-section mounted on and extending along the leading edge of each conveyer element.

HORACE D. HUME.
JAMES E. LOVE.